United States Patent [19]

Yeckley

[11] Patent Number: 5,508,241
[45] Date of Patent: Apr. 16, 1996

[54] SILICON NITRIDE BEARING BALL HAVING A HIGH ROLLING CONTACT FATIGUE LIFE

[75] Inventor: Russell L. Yeckley, Oakham, Mass.

[73] Assignee: Saint Gobain/Norton Industrial Ceramics Corp., Worcester, Mass.

[21] Appl. No.: 215,834

[22] Filed: Mar. 22, 1994

[51] Int. Cl.$^6$ .................................................. C04B 35/584
[52] U.S. Cl. ............................................... 501/97; 501/98
[58] Field of Search ........................................ 501/97, 98

[56] References Cited

U.S. PATENT DOCUMENTS

| | | | |
|---|---|---|---|
| 4,558,018 | 12/1985 | Matsuhiro et al. | 501/98 X |
| 4,615,990 | 10/1986 | Richon et al. | 501/97 X |
| 4,728,582 | 3/1988 | Comans et al. | 428/698 |
| 4,879,263 | 11/1989 | Komeya et al. | 501/97 |
| 4,886,556 | 12/1989 | Suzuki et al. | 264/63 |
| 4,935,388 | 6/1990 | Lucek | 501/97 |
| 5,002,907 | 3/1991 | Hayakawa et al. | 501/97 |
| 5,015,608 | 5/1991 | Matsuhisa et al. | 501/97 |
| 5,045,513 | 9/1991 | Mizuno et al. | 501/98 X |
| 5,098,872 | 3/1992 | Suyama et al. | 501/97 |
| 5,173,458 | 12/1992 | Mishioka et al. | 501/98 X |
| 5,217,931 | 6/1993 | Takami et al. | 501/88 |
| 5,326,733 | 7/1994 | Mizuno et al. | 501/98 X |
| 5,376,602 | 12/1994 | Nilsen | 501/97 |

FOREIGN PATENT DOCUMENTS

| | | | |
|---|---|---|---|
| 1290739 | 10/1991 | Canada | 253/10 |

OTHER PUBLICATIONS

K. Komeya and H. Kotani, "Development of a ceramic antifriction bearing", Int. J. of Materials and Product Technology, vol. 3, No. 1, 1988, pp. 54–67.
O. Kwon, "Silicon Nitride for High–Performance Bearings", Ceramic Bulletin, vol. 69, No. 7, 1990, p. 1113.
"NC–132 Hot–Pressed Silicon Nitride", Norton Company, Industrial Ceramics Division, Worcester, Massachusetts 01606 (No Date).
"Noralide$^R$ Bearing Grade Silicon Nitride NBD–200 Material Specification", Cerbec Ceramic Bearing Company, PDC/MS0004, Sep. 5, 1990, Revision B, pp. 1–3.

*Primary Examiner*—Karl Group
*Attorney, Agent, or Firm*—Thomas M. DiMauro

[57] ABSTRACT

A sintered silicon nitride ceramic having an L10 value of at least 50 million stress cycles in ASTM test STP 771 under 6.9 GPa applied contact stress.

8 Claims, No Drawings

SILICON NITRIDE BEARING BALL HAVING A HIGH ROLLING CONTACT FATIGUE LIFE

BACKGROUND OF THE INVENTION

Advanced structural ceramic materials have gained the attention of industry by virtue of their superior performance qualities. These qualities, such as superior high temperature strength, high toughness, and resistance to thermal shock and oxidation, provide the bases for their potential use in a variety of applications.

U.S. Pat. No. 4,935,388 (Lucek) suggests that the reliability of a ceramic material can be correlated with its spatial homogeneity, and that such homogeneity can be characterized by the extent to which the material exhibits optical anomalies. In particular, Lucek teaches that the reliability of silicon nitride greatly improves when the material is spatially homogeneous, e.g., has no optical anomalies greater than about 70 microns. Lucek suggests that the above optical anomalies signify a number of inhomogeneous phenomena, including, but not limited to, regions of porosity, regions of contamination from materials such as iron, and regions having microcracks. The silicon nitride ceramics disclosed by Lucek, which contained about 1 w/o MgO as a sintering aid, have a rolling contact fatigue life ("RCF life") defined by an L10 value of at least four million stress cycles in ASTM test STP 771 under 6.9 GPa applied contact stress. Although this RCF life is one of the highest known, commercial desire for silicon nitride materials having improved RCF life continues.

Accordingly, it is the object of the present invention to provide a silicon nitride material having a superior RCF life.

SUMMARY OF THE PRESENT INVENTION

In accordance with the present invention, there is provided a sintered silicon nitride material having an L10 value of at least 80 million stress cycles in ASTM test STP 771 under 6.9 GPa applied contact stress.

DETAILED DESCRIPTION OF THE PRESENT INVENTION

It has been unexpectedly found that adding between about 0.20 w/o and about 1.0 w/o alumina to a green body consisting essentially of silicon nitride and about 1 w/o MgO results in a ceramic having an unexpectedly high RCF life.

Without wishing to be tied to a theory, it is believed that, during the sintering of the conventional silicon nitride ceramics of Lucek, the MgO sintering aid and the 3 w/o silica (present in silicon nitride power as an impurity) formed at least two immiscible liquid phases at equilibrium, resulting in at least two grain boundary phases in the sintered body. This non-uniform grain boundary phase probably degraded the strength, toughness and RCF life of the ceramic. The alumina addition of the present invention is believed to provide a single $MgO-SiO_2-Al_2O_3$ phase at equilibrium, resulting in a single grain boundary phase according to a phase diagram. Hence, more uniform and higher properties result.

The silicon nitride ceramic of the present invention can be made from typical materials and conventional processing steps. In preferred embodiments, the ceramic is made from a silicon nitride powder or a precursor thereof. If the ceramic is made from a silicon nitride powder, any typical silicon nitride powder can be used. Typically, silicon nitride comprises at least about 94 w/o of the ceramic of the present invention, preferably between about 97 and about 98.5 w/o.

In preferred embodiments of the present invention, magnesia and alumina are used as sintering aids. Magnesia is added in amounts of from about 1.0 w/o to about 2.0 w/o, preferably between about 1.0 and about 1.6 w/o of the sintered ceramic. Most preferably, about 1 w/o of MgO, having a purity of more than 99% and an average particle size of less than 1 micron, is added. Similarly, alumina may be added in amounts of from about 0.20 w/o to about 1.0 w/o, more preferably between about 0.4 and about 0.6 w/o of the sintered ceramic. Most preferably, about 0.47 w/o of $Al_2O_3$, having a purity of more than 99% and an average particle size of less than 1 micron, is added.

Silica may be present in the starting silicon nitride powder as an impurity. As a result, silicon may be present in the grain boundary phase of the sintered ceramic in an amount of between about 2 and 4 w/o, preferably 2 and 3 w/o of the ceramic, as silica.

The silicon nitride and sintering aid powders may be mixed by any known mixing process including, but not limited to, ball milling and attrition milling. In preferred embodiments of the present invention, vibratory milling is preferred.

If a green body is formed, green body formation may be performed by any typical process used in art. These processes include slip casting, injection molding, freeze casting and cold isostatic pressing. In preferred embodiments of the present invention, the powders of the present invention are cold isostatic pressed.

The sintering cycle of the present invention may include any conventional sintering process, including pressureless sintering, gas pressure sintering, hot pressing and hot isostatic pressing using glass ("glass encapsulated hipping"). In preferred, embodiments of the present invention, the glass encapsulation hipping processes as described in U.S. Pat. Nos. 4,446,100, and 4,339,271 are used. It is further preferred that embodiments utilizing U.S. Pat. Nos. 4,446,110 and 4,339,271 be practiced at very high packing efficiency, i.e., with parts touching each other.

EXAMPLE I

Silicon nitride powder with the following characteristics was used as the powder in this example: more than about 90 w/o alpha $Si_3N_4$, less than about 2.0 w/o total oxygen, less than 0.1 w/o calcium, about 0.03 w/o iron, about 0.05 w/o aluminum, and a surface area of about 5–9 $m^2/g$.

About 98 parts by weight of this powder was combined with about 1.33 parts by weight of reagent grade magnesium carbonate and about 0.47 parts by weight alumina and isopropyl alcohol to form a slurry having 45% solids. The slurry was simultaneously blended and milled in a vibratory mill with $Si_3N_4$ milling media. The final surface area was about 10–14 $m^2/g$. The resultant slurry was passed through a 20 micron screen and a magnetic separator. The slurry was concentrated to 65% solids by cross-flow filtration. Next, PVP (polyvinylpyrrolidone) was added to the slurry in an amount of about 1.25 w/o of the powder. The slurry was then dried in an explosion-proof spray dryer. The dried powder was then passed through a 30 mesh nalgene screen. All of the above operations were performed in a class 1000 clean room dedicated to silicon nitride processing. The dried agglomerated powder was cold isostatically pressed at 30 ksi into cylinders and ground into rods having a diameter of about 0.52 inches and a length of about 3.8 inches. The powder compacts were air fired at 600° C. to remove the PVP. Samples were encapsulated in glass media and hot isostatically pressed at 30,000 psi (20.7 MPa) pressure for about 1 hour at about 1790° C.

EXAMPLES II and III

The above process was repeated essentially identically, except that ¼ inch balls and 3×4×50 mm flexure rods were produced.

The resulting ceramics were measured for hardness. Vickers diamond pyramid hardness indentations from 10 kg loads were created. The mean hardness was found to be about 15.2 GPa. In comparison, NBD-200, a 1 w/o MgO silicon nitride bearing material manufactured by the Norton Company of Worcester, Mass., has a hardness of about 15–15.6 GPa.

Fracture toughness was determined by the fracture of 4 point bend specimens of 3×4×50 mm containing a Vickers indentation (10 kg load) on the tensile surfaces within the inner span, at a crosshead speed of about 0.5 mm/min, according to procedures described by P. Chantikul et al., in "A Critical Evaluation of Indentation Techniques for Measuring Fracture Toughness II: Strength Methods", J. Am. Ceram. Soc. 64(9), pp. 539–544 (1981). The average toughness of the ceramics of the present invention was about 5.6 MPa m½. In comparison, NBD-200 has a fracture toughness of about 5–5.8 MPa m½.

The 4-point flexure strength of the ceramics of the present invention were also determined. 3×4×50 mm type B specimens on a 40 mm outer span and a 20 mm inner span test jig (ASTM C1161–90) were selected. The mean flexure strength was determined to be about 950 MPa. In comparison, NBD-200 has a flexural strength of about 700–850 MPa.

Tensile strength was also analyzed by the ASCERA Tensile Test Procedure. This procedure is set out in Brit. Ceram. Trans J., 89, 21–23, 1990. The tensile strength of the present invention was found to be about 475 MPa. In comparison, NBD-200 has a tensile strength of about 400 MPa.

The rods made in Example II were subjected to rolling contact fatigue (RCF) tests, specifically the accelerated bearing test procedure described in ASTM-STP 771. This test procedure applies contact pressure higher than that normally encountered in service in order to accelerate the fatigue failure of the test material. The test uses statistical analysis of data from numerous test specimens, and the results are normally reported in terms of a variable Lx, which denotes the number of stress cycles which cause failure in X percent of the specimens tested at a given stress level. In carrying out the RCF test for the present invention, three slave balls made of AISI 52100 steel were loaded against a rod consisting of the silicon nitride of the present invention at an average contact stress of about 6.9 GPa. The rod was rotated at about 3600 rpm with an electric motor. Both the slave balls and the rod were lubricated with lubricating oil supplied by a drip feeder at a rate of about 8 drops per minute. The test produced circumferential fatigue tracks in the rod which were about 0.1 inches in width. The silicon nitride of the present invention displayed normal failure modes and uniform wear. Of the 24 rods of the present invention which were subjected to RCF testing, the first rod to fail did so at about 54 million cycles. If a Weibull slope of about 0.74 is assumed (i.e., it is assumed the present invention has the same failure mechanism as NBD-200), an L10 of about 80 million cycles is realized for the present invention. In comparison, NBD-200 has an L10 RCF life of 4 million cycles.

The mechanical characteristics of the present invention as exemplified by Examples I–III are summarized in Table 1, along with comparative silicon nitride ceramic NBD-200.

TABLE 1

| PROPERTY | EXAMPLES I–III | NBD-200 |
| --- | --- | --- |
| L10 RCF Life (cycles) | 80,000,000 | 4,000,000 |
| Tensile Strength (MPa) | 475 | 400 |
| Flexural strength (MPa) | 950 | <850 |
| Fracture Toughness (MPa m½) | 5.6 | <5.8 |
| Hardness (GPa) | 15.2 | <15.6 |

The silicon nitride of the present invention may be used in a number of conventional ceramic applications, including but not limited to, ball bearings, roller bearings, plain sliding bearings and other structural or wear applications.

I claim:

1. A sintered silicon nitride ball bearing consisting essentially of:

a) at least about 94 w/o of a crystalline phase of silicon nitride, and b) a single grain boundary phase consisting essentially of Mg, Al, Si and O, wherein the grain boundary phase consists essentially of between 1 and 2 w/o Mg, as magnesia; between 0.2 and 1.0 w/o Al, as alumina; between 2 and 4 w/o Si, as silica; and oxygen.

2. The sintered silicon nitride ball bearing of claim 1 wherein the Al component of the grain boundary phase is between 0.3 and 0.6 w/o, as alumina, of the bearing.

3. The sintered silica, on nitride ball bearing of claim 1 wherein the Si component of the grain boundary phase is between 2.0 and 3.0 w/o, as silica, of the bearing.

4. The sintered silicon nitride ball bearing of claim 1 having an L10 value of at least 50 million stress cycles in ASTM test 771 under 6.9 GPa applied contact stress.

5. The sintered silicon nitride ball bearing of claim 1 having an L10 value of at least 60 million cycles.

6. The sintered silicon nitride ball bearing of claim 1 having an L10 value of at least 70 million cycles.

7. The bearing of claim 1 having an L10 value of at least 70 million cycles.

8. The sintered silicon nitride ball bearing of claim 1 having a flexural strength of at least 950 MPa.

* * * * *